United States Patent
Meskimen et al.

(10) Patent No.: US 11,729,432 B2
(45) Date of Patent: Aug. 15, 2023

(54) INFLIGHT ENTERTAINMENT SYSTEM USING VIDEO OBJECT RECOGNITION TO MONITOR SEAT AREAS AND GENERATE FLIGHT CREW NOTIFICATIONS

(71) Applicant: Thales Avionics, Inc., Irvine, CA (US)

(72) Inventors: Samuel Colt Meskimen, Huntington Beach, CA (US); Ruchik Samir Dave, Irvine, CA (US); Jean-Yves Couleaud, Mission Viejo, CA (US)

(73) Assignee: Thales Avionics, Inc., Irvine, CA (US)

( * ) Notice: Subject to any disclaimer, the term of this patent is extended or adjusted under 35 U.S.C. 154(b) by 353 days.

(21) Appl. No.: 16/688,040

(22) Filed: Nov. 19, 2019

(65) Prior Publication Data

US 2021/0150235 A1    May 20, 2021

(51) Int. Cl.
*H04N 21/214* (2011.01)
*H04N 21/414* (2011.01)
(Continued)

(52) U.S. Cl.
CPC ..... *H04N 21/2146* (2013.01); *B64D 11/0015* (2013.01); *B64D 11/062* (2014.12); *B64D 11/0638* (2014.12); *B64D 45/00* (2013.01); *B64D 47/08* (2013.01); *G06F 18/217* (2023.01); *G06N 3/04* (2013.01); *G06N 3/08* (2013.01);
(Continued)

(58) Field of Classification Search
CPC ........... G06K 9/00832; G06K 9/00718; G06K 9/6262; B64D 11/062; B64D 11/0638; B64D 11/0015; B64D 45/00; B64D 47/08; B64D 2045/007; B64D 2221/00; G06N 3/04; G06N 3/08; H04N 21/2146; H04N 21/41422; H04N 21/4223; H04N 21/4882; H04N 7/181

See application file for complete search history.

(56) References Cited

U.S. PATENT DOCUMENTS

| | | |
|---|---|---|
| 10,691,955 B1 | 6/2020 | Correia Gracio et al. |
| 2013/0066526 A1* | 3/2013 | Mondragon ............ G06F 3/017 701/48 |

(Continued)

OTHER PUBLICATIONS

Invitation to Pay Additional Fees and Results of the Partial International Search dated Mar. 11, 2021 for International Application No. PCT/US2020/061030, 13 pages.

*Primary Examiner* — Kyu Chae
(74) *Attorney, Agent, or Firm* — Sage Patent Group

(57) ABSTRACT

An object recognition computer for a vehicle includes at least one processor and at least one memory storing program code executable by the at least one processor to perform operations. The operations are configured to receive video streams from a plurality of cameras spaced apart within the vehicle and each having a field-of-view capturing at least one passenger seat. For each of the video streams, the operations retrieve from a data structure information that defines a region within video frames of the video stream where object recognition is to be performed to attempt to identify a defined object associated with the at least one passenger seat. The operations then perform object recognition limited to within the defined region to identify the defined object. Notifications can be selectively generated to passengers and/or crew based on the object recognition.

20 Claims, 9 Drawing Sheets

(51) Int. Cl.
*H04N 21/4223* (2011.01)
*H04N 21/488* (2011.01)
*B64D 11/06* (2006.01)
*B64D 11/00* (2006.01)
*B64D 45/00* (2006.01)
*B64D 47/08* (2006.01)
*G06N 3/04* (2023.01)
*G06N 3/08* (2023.01)
*G06V 20/59* (2022.01)
*G06V 20/40* (2022.01)
*G06F 18/21* (2023.01)
*G06V 10/774* (2022.01)
*H04N 7/18* (2006.01)

(52) U.S. Cl.
CPC ............ *G06V 10/774* (2022.01); *G06V 20/41* (2022.01); *G06V 20/59* (2022.01); *G06V 20/593* (2022.01); *H04N 21/41422* (2013.01); *H04N 21/4223* (2013.01); *H04N 21/4882* (2013.01); *B64D 2045/007* (2013.01); *B64D 2221/00* (2013.01); *H04N 7/181* (2013.01)

(56) References Cited

U.S. PATENT DOCUMENTS

| | | | |
|---|---|---|---|
| 2017/0068863 A1* | 3/2017 | Rattner | G06K 9/00838 |
| 2017/0283086 A1 | 10/2017 | Garing et al. | |
| 2019/0225186 A1 | 7/2019 | Szawarski et al. | |
| 2019/0258263 A1 | 8/2019 | Wendel et al. | |
| 2019/0311202 A1* | 10/2019 | Lee | G06K 9/6256 |
| 2020/0231109 A1* | 7/2020 | Baltaxe | G06N 3/08 |

* cited by examiner

INFLIGHT ENTERTAINMENT SYSTEM USING VIDEO OBJECT RECOGNITION TO MONITOR SEAT AREAS AND GENERATE FLIGHT CREW NOTIFICATIONS

FIELD OF THE INVENTION

The present disclosure relates to inflight entertainment systems for use in aircraft and, more particularly, to generating flight crew notifications through inflight entertainment systems.

BACKGROUND

Flight crew are tasked with monitoring passenger activity while onboard aircraft and during all flight phases, including taxiing for takeoff, takeoff roll, climbing to altitude, during safety situations such as turbulence, landing approach, and taxing to an airport gate. Flight safety regulations require that flight crew ensure that passengers remain seated with fastened seatbelts, seats remain in an upright position, and tray tables remain stored in a locked position during some of the flight phases such as taxiing, takeoff, and landing and during certain flight safety situations. Crew members typically broadcast instructions through speakers and sometimes through seat video display units to passengers, and subsequently travel along the aisles to visually observe passengers' compliance and to provide passenger targeted follow-up instructions when needed. However, it is known that some passengers ignore or don't understand the initial broadcasted crew instructions and fail to follow-through on targeted follow-up instructions. It is also known that passengers are capable of quickly deploying tray tables, reclining seats, unfastening seatbelts, etc., when the crew members are no longer observing. Besides being an inefficient use of crew member resources, serious passenger and flight safety concerns are created when passenger compliance with crew member instructions is not ensured at all times.

SUMMARY

Various embodiments of the present disclosure are directed to performing object recognition within video streams from cameras that are spaced apart within a vehicle, such as aircraft cabin, to provide a more automated monitoring of video seat areas and which may trigger automated notifications to crew members and/or to passengers when one or more defined rules are satisfied. Some further embodiments are directed to improving the computational efficiency and/or accuracy of the object recognition operations processing the video streams and/or to reducing network bandwidth that is used by communication of the video streams.

One embodiment of the present disclosure is directed to an object recognition computer for a vehicle, such as aircraft cabin. The object recognition computer includes at least one processor and at least one memory storing program code executable by the at least one processor to perform operations. The operations are configured to receive video streams from a plurality of cameras spaced apart within the vehicle and each having a field-of-view capturing at least one passenger seat. For each of the video streams, the operations retrieve from a data structure information that defines a region within video frames of the video stream where object recognition is to be performed to attempt to identify a defined object associated with the at least one passenger seat. The operations then perform object recognition limited to within the defined region to identify the defined object.

Some further embodiments are directed to automating the process by which the object recognition computer is trained to identify where particular types of objects are located within each of the video streams from the different cameras, which can be particularly advantageous because of the variability in the relative orientations and locations of passenger seats relative to the observing cameras between different types of aircraft configurations and/or to compensate for time-based variations in the seat configuration and/or camera configuration within a particular aircraft over its operational lifetime. Associated operations during a training mode cause the object recognition computer to learn where particular types of objects are located within each of the video streams and to define corresponding regions for those objects. In one embodiment the operations performed during a training mode are configured to, for each of a plurality of different types of objects, identify location of the type of object within the video frames of the video stream, define a region of the video frames that at least partially overlaps the location of the type of object, and store information defining the region in the data structure with an association to the type of object.

Some further embodiments are directed to training neural networks to perform machine learning that dynamically tracks changes over time where particular types of objects are located within the video streams from each of the different cameras. The object recognition computer can include a neural network circuit is configured to learn where particular types of objects are located within each video streams from the different cameras. When the object recognition computer identifies the locations of the defined types of objects during a training mode, the operations repeat for each of the video streams and for each region within the video frames of the video stream that is defined by the information in the data structure, to train weight values of layers of the neural network using the video data contained within the region of the video frames.

Some further embodiments are directed to utilizing powerline communications for communicating the video streams from the dispersed cameras to the object recognition computer using powerlines that supply power to seat reading light devices and/or other devices at passenger seats. In one embodiment, the object recognition computer includes powerline communication transceiver circuits that are connected to powerlines connected to feed power from at least one power distribution circuit to seat reading light devices that are distributed within the vehicle to provide light to passenger seat areas. The cameras are connected to communicate the video streams through a group of the powerline communication transceiver circuits and the powerlines toward the object recognition computer. The object recognition computer is connected to receive the video streams through one of the powerline communication transceiver circuits and the powerlines.

These and further embodiments are described in detail below with regard to the following drawings. Corresponding vehicle entertainment systems, methods and computer program products are also disclosed. It is intended that all such vehicle entertainment systems, methods and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to providing improved monitoring passenger activity with aircraft seat mechanisms, including one or more of whether seat tray tables are deployed or stored, whether seat belt buckles are fastened or unfastened, whether a seatback is reclined or upright, etc., and/or monitoring of passengers themselves and/or personal items they brought onboard, such as whether a laptop computer exceeding a defined size is deployed on a passenger's lap, whether a handbag is blocking egress of a passenger from a seat area, etc. Some further embodiments can generate automatic notifications to crew terminal(s) or to video display seat units associated with particular passengers when one or more defined notification rules are satisfied responsive to the monitored activities.

Example Camera Configurations for Video Object Recognition and Monitoring

Figure 1:
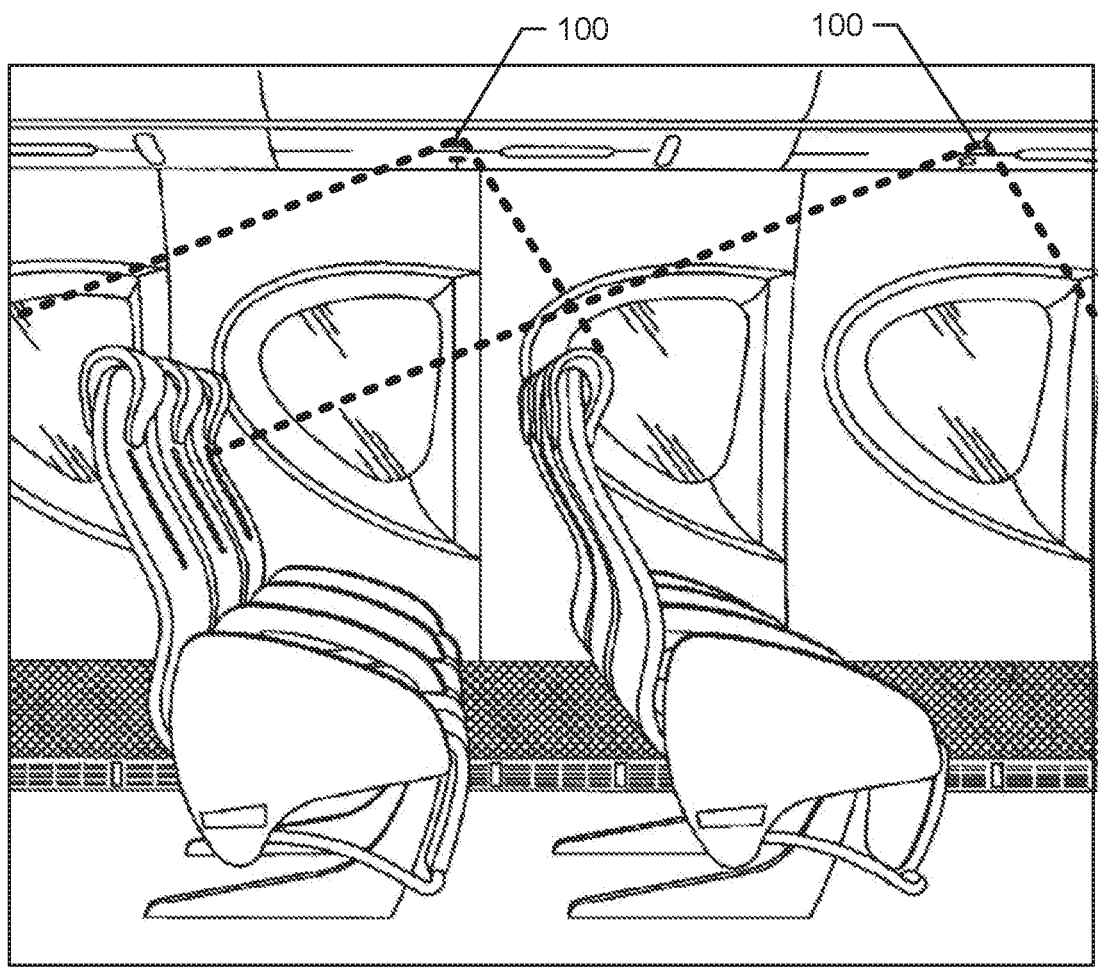
FIG. 1 illustrates cameras positioned over seats to provide video streams to an object recognition computer that identifies various defined seat-based objects and can trigger notifications when one or more rules are satisfied, in accordance with some embodiments of the present disclosure.

FIG. 1 illustrates cameras 100 that are positioned over seats to provide video streams to an object recognition computer (500 in FIG. 5) that identifies defined types of seat-based objects and can trigger notifications when one or more rules are satisfied. Referring to FIG. 1, each of the cameras 100 is optically configured and mounted to have a field-of-view (FOV), illustrated as an angle between dashed lines, that captures in its output video stream at least part of at least one seat area. For example, each camera 100 may be optically configured and mounted over each passenger seat adjacent to ceiling-mounted reading lights 620, so that three cameras 100 are spaced apart each adjacent to a different one of three reading lights 620 positioned over three adjacent seats in a row. Alternatively, each camera 100 may be optically configured and mounted to capture in its output video stream at least a part of each seat area in a row so that only a single camera 100 is positioned over each row of seats. Alternative, each camera 100 may be optically configured and mounted to capture in its output video stream at least a part of at least one seat area in two or more rows of seats so that fewer cameras are needed to monitor passenger activity in those seating areas of an aircraft cabin, and which may correspondingly reduce the number of resulting video streams from the cameras 100 that need to be processed by the object recognition computer. The cameras 100 are each electrically configured to provide their output video streams through one or more data networks within the aircraft to the object recognition computer, which may be part of an in-flight entertainment system or separate therefrom and which may reside in a line replaceable unit (LRU) or other electronics enclosure.

As will be explained in further detail below, the object recognition computer (500 in FIG. 5) is configured to perform object recognition within video streams from the cameras to provide a more automated monitoring of video seat areas and which may trigger automated notifications to crew members and/or to passengers when one or more defined rules are satisfied. The object recognition computer (500 in FIG. 5) can be configured to perform object recognition within video frames of each of the video streams from the cameras 100 to determine whether tracked seats are occupied by passengers, whether tracked tray tables are stored or deployed, whether tracked seats are upright or reclined, and/or whether tracked seatbelt apparatuses are fastened or unfastened.

Figure 7:
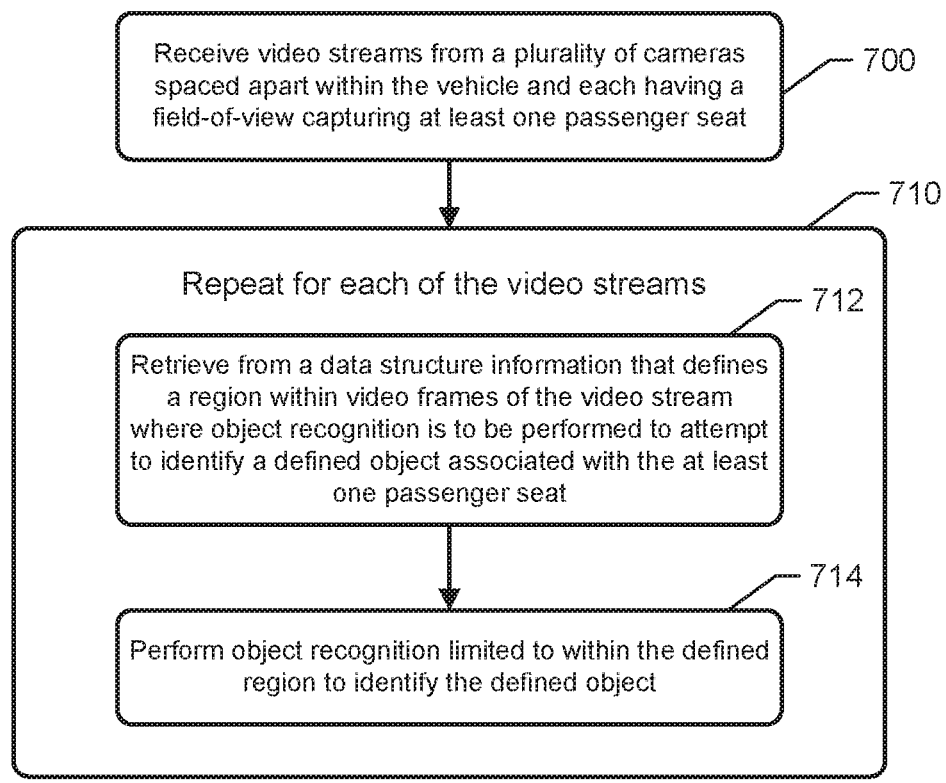
FIG. 7 is a flowchart of operations that can be performed by an object recognition computer to identify objects within regions of the video frames that are associated with various defined types of objects, in accordance with some embodiments of the present disclosure.

The computational efficiency of the object recognition computer may be improved and/or the accuracy of the object recognition may be improved by the object recognition operations being performed within defined regions that are associated with defined types of objects. FIG. 7 is a flowchart of operations that can be performed by an object recognition computer. Referring to FIG. 7, object recognition computer receives video streams from a plurality of cameras spaced apart within the vehicle and each having a field-of-view capturing at least one passenger seat. The object recognition computer repetitively performs operations 710 on each of the video streams to: retrieve 712 from a data structure information that defines a region within video frames of the video stream where object recognition is to be performed to attempt to identify a defined object associated with the at least one passenger seat; and perform 714 object recognition limited to within the defined region to identify the defined object. Thus, instead of performing object recognition throughout the entirety of the video frames, the object recognition is constrained to the defined region for one of the defined objects, such as Moreover, as will be explained in further detail below, the object recognition computer may be further configured to generate automatic notifications to crew terminal(s) or to video display seat units associated with particular passengers when one or more defined notification rules are satisfied responsive to the monitored activities. The video display seat units may be mounted to seat-back surfaces and/or seat armrest structures, and/or may be passenger equipment that is transported by passengers onto the aircraft. Nonlimiting examples of passenger equipment includes mobile phones, tablet computers, laptop computers, etc., that are networked to the object recognition computer through one or more wireless and/or wired data networks of the aircraft.

Figure 2:
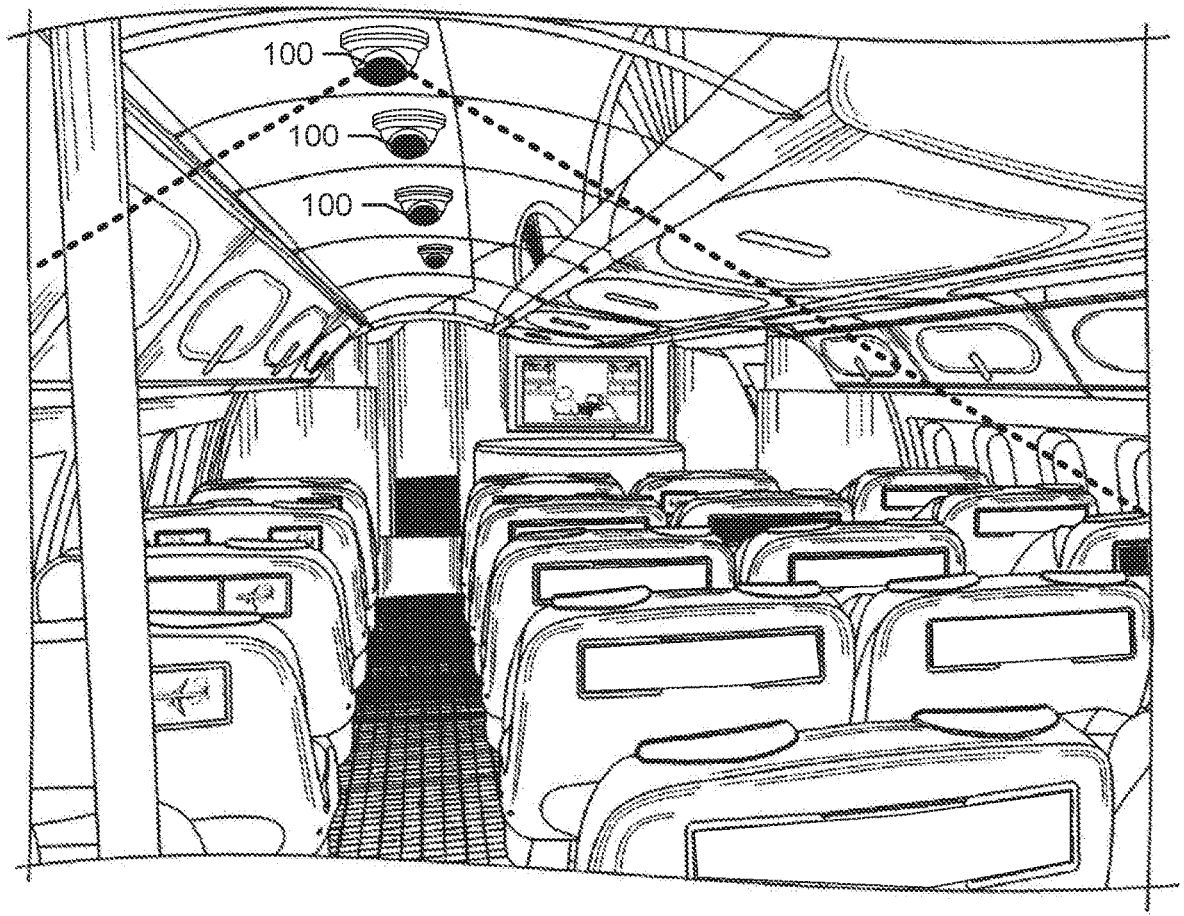
FIG. 2 illustrates cameras positioned over an aisle between seats to provide video streams to an object recognition computer for identifying defined types of seat-based objects and which may trigger notifications when one or more rules are satisfied, in accordance with some embodiments of the present disclosure.

FIG. 2 illustrates cameras 100 positioned over an aisle between seats to provide video streams to an object recognition computer for identifying defined types of seat-based objects and which may trigger notifications when one or more rules are satisfied. The cameras 100 of FIG. 2 are optically configured and mounted to have a wider FOV (illustrated as an angle between dashed lines) than the cameras 100 of FIG. 1 to enable the video stream from each camera 100 of FIG. 2 to capture, for example, at least part of each seat area of an entire row on both sides of the aisle, or at least part of each seat area of two or more rows on both sides of the aisle. Configuring and mounting the cameras 100 for use along an aisle can substantially reduce the number of cameras that are needed to monitor passenger activity in seating areas of an aircraft cabin and correspondingly substantially reduce the number of resulting video streams that are communicated from the cameras 100 for processing by the object recognition computer.

Example in-Flight Entertainment System with Object Recognition Computer

Figure 5:
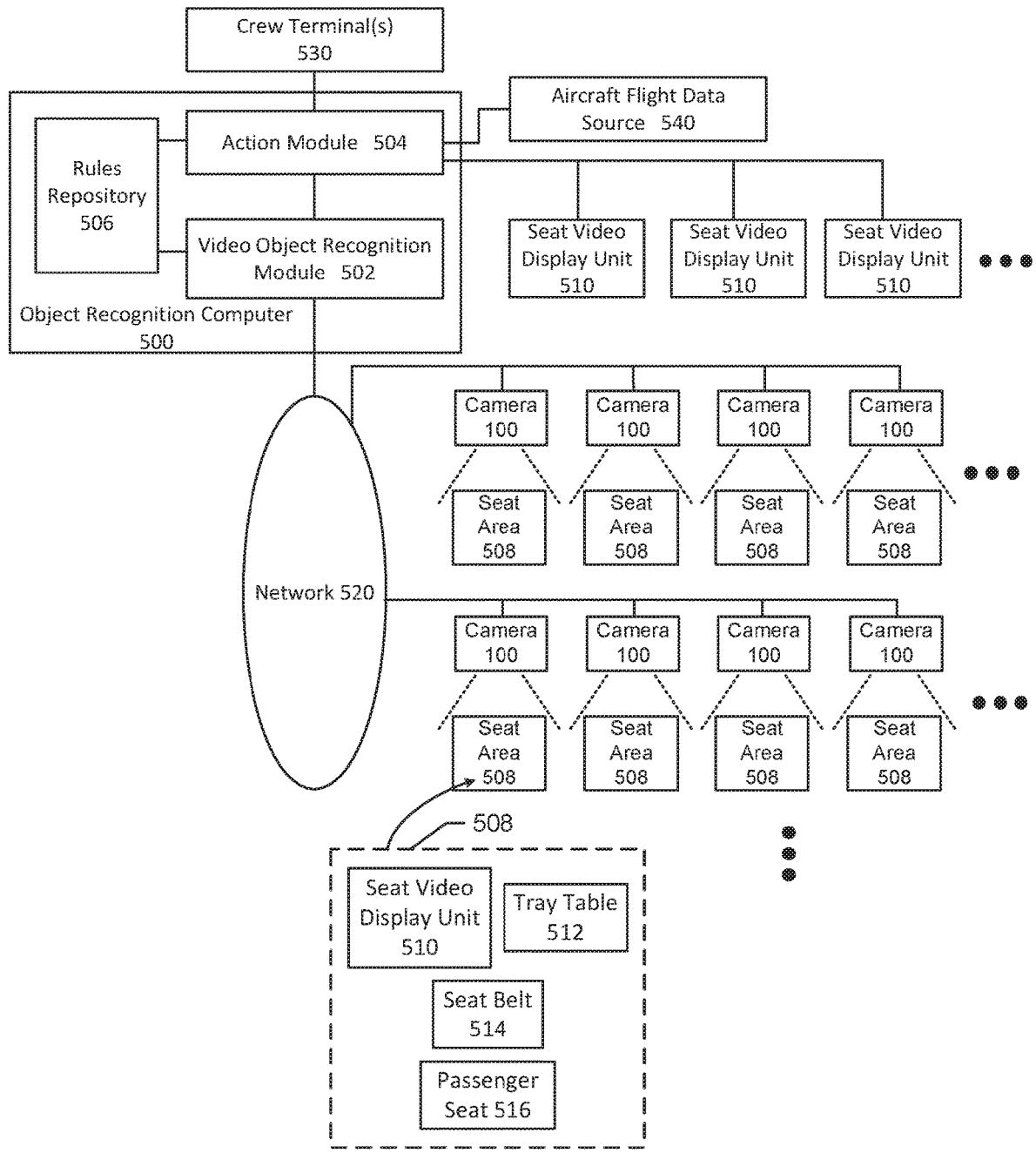
FIG. 5 is a block diagram of an inflight entertainment system with cameras that are spaced apart along an aircraft cabin to observe seating areas and which supply video streams to an object recognition computer to recognize defined types of objects and provide notifications to crew terminals and/or to passenger seat video display units, in accordance with some embodiments of the present disclosure.

FIG. 5 is a block diagram of an inflight entertainment system with cameras 100 that are spaced apart along an aircraft cabin to observe seating areas and which supply video streams to the object recognition computer 500 to recognize defined types of objects and provide notifications to crew terminals 530 and/or to passenger seat video display units 510, in accordance with some embodiments of the present disclosure.

Although various embodiments herein are primarily described in the context of an inflight entertainment (IFE) system within an aircraft cabin, the invention is not limited thereto. Instead, embodiments herein may be used to monitor activity through video-based object recognition in seat areas of trains, automobiles, cruise ships, buses, etc., and in non-vehicle environments such as convention centers, sports arenas, business meeting rooms, etc. When used in an aircraft, a bus, a train, or other vehicle where seats are arranged in rows and columns, the seat video display units 510 can be attached to seatbacks so they face passengers/users in adjacent rearward seats. The seat video display units 510 may alternatively be mounted to bulkheads, movable support assemblies connected to seat armrests and/or seat frames, etc. The seat video display units 510 may include devices that are transported by passengers/users, such as mobile phones, tablet computers, laptop computers, etc.

Referring to the example of FIG. 5, the example inflight entertainment system includes cameras 100, the object recognition computer 500, one or more crew terminals 530 (e.g., crew accessible computers mounted on aircraft structures and/or transportable by crew), and may include seat video display units 510. Each of the cameras 100 are configured to output video streams through one or more data networks 520 to the object recognition computer 500. The example cameras 100 are illustrated as having a one-to-one correspondence to each seat area 508, whereby each camera may be positioned overhead a seat adjacent to a seat-focused reading light, with a FOV configured so that the video stream that is output therefrom captures one or more defined objects that can be present in the seat area 508 and which the object recognition computer 500 is configured to identify. However, as explained above with regard to FIGS. 1 and 2, the cameras 100 may alternatively be each optically configured and mounted to output a video stream that captures objects located in more than one seat area 508.

The object recognition computer 500 can execute a video object recognition module 502 that operates to process each of the video streams from the cameras 100 to identify one or more defined types of objects that are associated with the seat areas 508. The object recognition computer 500 can further execute an action module 504 that determines whether the identified objects satisfy one or more action rules defined in a rules repository 506. The action module 504 can responsively trigger one or more actions, such as generating a notification to the crew terminal(s) 530 and/or to one or more seat video display units 510 which are identified as being proximately located to the identified object.

Example objects that can be identified by the video object recognition module 502 and associated status determinations and can be made by the action module 504 can include, but are not limited to, whether seat tray tables 512 are deployed or stored, whether seats are occupied or unoccupied, whether seat belt buckle apparatuses 514 are fastened or unfastened, whether a seatback 516 is reclined or upright, etc., and/or monitoring of passengers themselves and/or personal items they brought onboard, such as whether a laptop computer exceeding a defined size is deployed on a passenger's lap, whether a carry-on handbag is blocking egress of a passenger from a seat area 508, etc.

In some further embodiments, the action module 504 can select among the rules in the rules repository 506 based on electronic commands that are received from crewmembers, e.g. via the crew terminal 530, and/or that are identified responsive to characteristics of aircraft flight data from the source 540, e.g., flight data network. For example, responsive to the crew members triggering a fasten seat belt notification and/or responsive to the aircraft flight data indicating that the aircraft has initiated a mode associated with departure from an airport gate for takeoff, the action module 504 can select one or more rules that cause the video object recognition module 502 to analyze video streams from the cameras 100 to determine whether seat belt buckle apparatuses 514 of passenger occupied seats remain fastened, determine whether seats remain in an upright position, determine whether tray tables remain in a stored position, etc. Responsive to the video object recognition module 502 determining any one of: a passenger occupied seat not having a fastened seatbelt apparatus, a passenger occupied seat become reclined, a tray table moved to a deployed position, or other condition that violates the rule(s), the action module 504 can determine a location of the seat within the cabin and send a first corrective notification to a display device that is associated with the seat location (e.g., constructing the passenger to take corrective action such as by fastening the seatbelt apparatus, storing the tray table, etc.) and/or send another corrective notification to the crew terminal 530 that identifies the seat location where the determined condition occurs.

In this manner, the object recognition computer 500 can perform continuous real-time monitoring of passenger compliance with crew instructions, and can trigger remedial actions involving instructing passengers to correct compliance issues and/or notifying crewmembers when their assistance is required.

Figure 3:
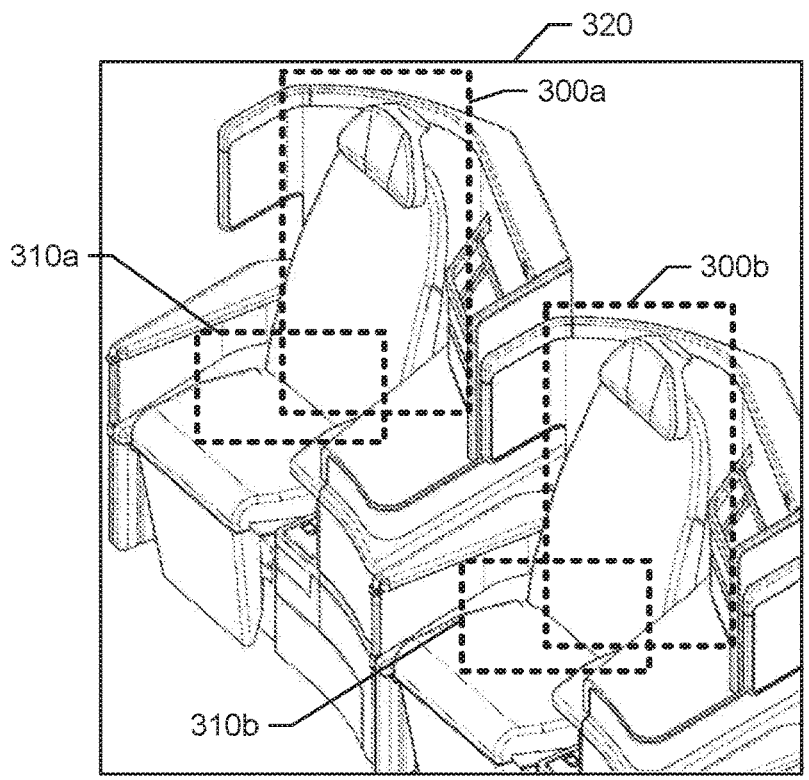
FIG. 3 illustrates a plurality of configurable object-specific recognition regions within video frames of a video stream that are located on adjacent seats and/or illustrates a plurality of video frame regions which the object recognition computer can selectively control the camera to crop video frames to before communicating the video stream thereto, in accordance with some embodiments of the present disclosure.

Object-Specific Recognition Regions and/or Selective Cropping of Video Frames Based on Type of Object Recognition FIG. 3 illustrates a plurality of configurable object-specific recognition regions within video frames of a video stream that are located on adjacent seats and/or illustrates a plurality of video frame regions which the object recognition computer 500 can selectively control the camera 100 to crop video frames to before communicating the video stream thereto, in accordance with some embodiments of the present disclosure.

Referring to FIG. 3, the data structure defines a plurality of different regions 300*a-b* and 310*a-b* within the video frames of the video stream. The different regions 300*a*, 300*a-b* and 310*a-b* are associated with locations of different types of objects that are to be identified by the object recognition computer 500. For example, object recognition is performed by the object recognition computer 500 in region 300*a* of the video frames from a camera showing an area of one seat, and performs object recognition in region 300*b* of the video frames showing an area of an adjacency seat to identify, for example, whether passengers are occupying the seats. Alternative or additionally, the object recognition performed in regions 300*a-b* can determine whether the seats are in a reclined or upright position. Similarly, object recognition is performed in regions 310*a* and 310*b* to determine, for example, whether tray tables of the two seats are deployed or stored, whether seatbelts of the two seats are fastened or unfastened, etc. When performing the object recognition for one of the types of objects, the operations for object recognition are performed only within the region that is associated with the one type of the objects. Thus for example, when determining whether the leftmost seat is occupied, the object recognition computer 500 performs object recognition only within the region 300*a* within the video frames of the video stream from the camera capturing those two seats.

Limiting the object recognition by the object recognition computer 500 when looking for a defined type of object to processing only within the defined region of the video frames that is associated by the data structure with the defined type of object, can substantially reduce the processor and memory utilization of the object recognition computer 500 and can substantially increase the accuracy of the object recognition by avoiding possible false recognition of objects captured in the video frames which are outside the defined region.

In some embodiments, the data structure defines one of the regions as being associated with a location of a portion of a seat that is covered by a passenger when seated on the seat and that is exposed when a passenger is not seated. The operations for object recognition perform the operations for object recognition only within the one of the regions within the video frames that is associated by the data structure with the location of the portion of the seat that is covered by a passenger when seated on the seat and is exposed when a passenger is not seated, and identify whether the portion of the seat is occupied or is not occupied by a passenger within the one of the regions within the video frames that is associated by the data structure with the location of the portion of the seat.

The operations for object recognition for determining whether seats are occupied may be initiated responsive to an electronic command for passengers to be seated, such as by a vehicle crew member turning on a fasten seatbelt sign. These operations may be further configured to determine a set of seats that is occupied before the electronic command is initiated and respond to a determination that a seat among the set of seats is no longer occupied by identifying, based on an identity of which of the video streams from the plurality of cameras the portion of the seat is not occupied, a seat location associated with the seat that is not occupied. The object recognition computer 500 can send a seat unoccupied notification to crew terminal that identifies the seat location.

As explained above, the action module 504 can send a notification message to the crew terminal(s) 530 to notify the crew members of a status of an object. The action module 504 can send a notification message to a video display unit associated with a passenger, such as to a SVDU 510 where the passenger is located and/or to a device transported by the passenger. For example, while the action module 504 determines the status of an object responsive to a command received from a crew member through the crew terminal(s) 530 and/or determined based on aircraft flight data received from an aircraft flight data source 540, such as from an aircraft flight data bus that the aircraft is taxiing for takeoff or climbing to altitude while the seatbelt light is being displayed to passengers, the action module 504 can respond to determination by the video object recognition module 502 that a seatbelt apparatus 514 was previously fastened has now become unfastened, by determining a location of the passenger seat and sending a notification that identifies the passenger seat to a crew member via the crew terminal 530 and/or sending a notification to a video display unit that is associated with the identified passenger seat that notifies the particular passenger to fasten the seatbelt apparatus 514.

In other examples, crewmembers can be informed when passengers have returned to their seats after food service has begun which can facilitate following up with passengers who may have missed opportunity to participate in the food service.

In some embodiments, the data structure defines one of the regions as being associated with a location of a seat belt buckle apparatus when fastened; and the operations for object recognition perform the object recognition operations only within the one of the regions within the video frames that is associated by the data structure with the location of the seat belt buckle apparatus when fastened. The object recognition operations identify whether the seat belt buckle apparatus is fastened or unfastened within the one of the regions of the video frames that is associated by the data structure with the seat belt buckle apparatus when fastened.

The operations for object recognition of whether a seat belt buckle apparatus is fastened can be initiated responsive to an electronic command for passengers to fasten seat belts. The operations are further configured to determine a set of seats that are occupied before the electronic command is initiated and respond to a determination that a seat belt buckle apparatus associated with one of the seats in the set is unfastened by identifying, based on an identity of which of the video streams from the plurality of cameras 100 the seat belt buckle apparatus appears to be unfastened, a seat location associated with the seat belt buckle apparatus that is unfastened. The object recognition computer 500 can then send a first seat belt notification to a display device 510 associated with the seat location notifying a passenger to fasten the seat belt buckle apparatus and/or can send a second seat belt notification to a crew terminal 530 that identifies the seat location where the seat belt buckle apparatus is unfastened.

Some other embodiments are directed to the object recognition computer 500 controlling the cameras 100 to crop the video frames that they output in their video streams to contain only the defined region that is associated with a defined type of object. In the context of the example illustration of FIG. 3, the video frame regions 300a, 300b, 310a, and 310b can be areas that the camera can be selectively controlled to crop its video frames to any one or more of. Thus, for example, the object recognition computer 500 when attempting to identify whether seatbelts are fastened, may control the cameras 100 to crop the video frames that they output in their video streams to only contain a defined region, e.g., 310a and 310b in FIG. 3, that has been determined and defined within the data structure to be associated with locations of the seatbelt buckle apparatuses.

The object recognition computer 500 can use the identifier for a particular type of object that is to be presently identified as an index to look up in the data structure for each of the cameras 100 what particular region that particular camera 100 should crop its video frames to when communicating a video stream to the object recognition computer 500. The object recognition computer 500 may send commands that are customized for each of the cameras by identifying what particular region, e.g., X-Y ranges within a video frame, that camera 100 is to crop its video frames to. It is noted that because different ones of the cameras 100 will have different orientations relative to seat areas and consequential differences in where particular types of objects can be located within their video frames, the object recognition computer 500 can have a training phase during which it determines where particular objects are located within the video stream from a particular camera and store associated information in the data structure for future use in controlling cropping by the particular camera.

Alternatively, the object recognition computer can send a command to the cameras that identifies a particular type of object that the video frames are to be cropped to, and each of the cameras can be configured to determine what region of the video frames contains that particular type of object and to correspondingly crop its video frames to that region for communication to the object recognition computer 500.

As noted above, cropping the video frames to one or more defined regions can substantially reduce the data bandwidth requirements of the network is utilized to transport the video streams from the numerous cameras 100 to the object recognition computer 500. Moreover, such video frame cropping can substantially reduce the processor and memory utilization of the object recognition computer 500 and can substantially increase the accuracy of the object recognition by avoiding possible false recognition of objects that could otherwise be captured in the video frames outside the defined region.

In the example illustrated in FIG. 3, the video frame 320 captures two adjacent seats. The video frame 320 may be cropped to communicate only the video stream within region 300a which can be analyzed to identify whether passengers present in the left seat and/or which can be analyzed to determine whether the left seat is reclined or upright. Similarly, the video frame 320 may be cropped to region 310a which can be analyzed to identify whether a seat belt of the left seat is fastened or unfastened. The camera may be controlled to crop the video frame 320 to contain more than one of the regions at a time. For example, the camera may be controlled to crop the video frame 320 to only contain regions 300a and region 300b, to only contain regions 310a and 310b, or to only contain regions 300a, 300b, 310a, and 310b.

Figure 4:
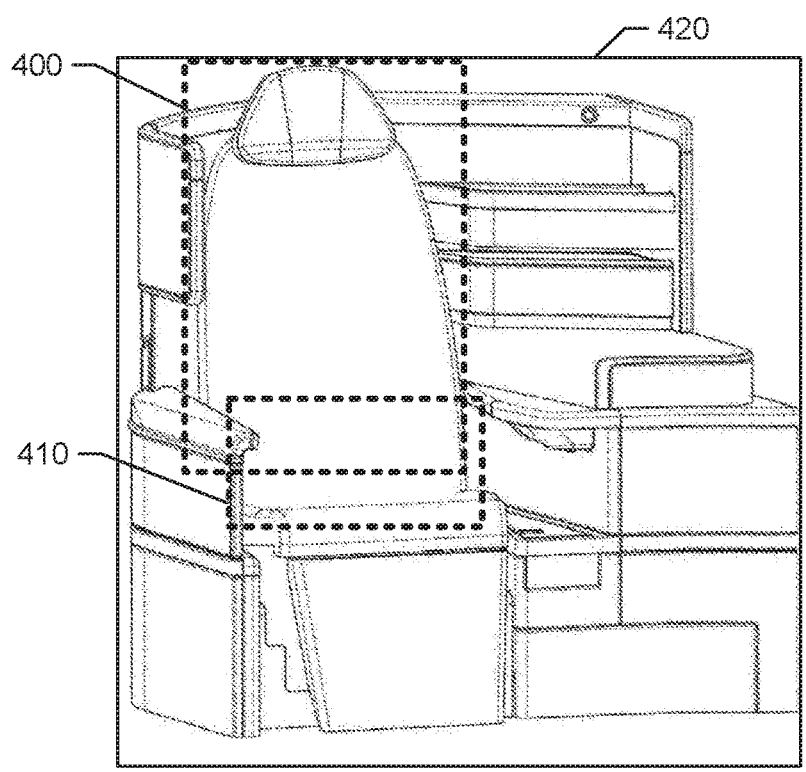
FIG. 4 illustrates another plurality of object-specific recognition regions on another seat configuration that are selectively configurable by the object recognition computer to perform corresponding types of object recognition within video frames of a video stream from a camera and/or illustrates a plurality of video frame regions which the object recognition computer can selectively control the camera to crop video frames to before communicating the video stream thereto, in accordance with some embodiments of the present disclosure.

FIG. 4 illustrates another plurality of object-specific recognition regions 400 and 410 capturing another seat configuration that are selectively configurable by the object recognition computer 500 to perform corresponding types of object recognition within video frames of a video stream from a camera 100. Alternatively or additionally, FIG. 4 illustrates a plurality of video frame regions which the object recognition computer 500 can selectively control the camera 100 to crop video frames to before communicating the video stream thereto. In the example illustrated in FIG. 4, the video frame 420 may be cropped to communicate only region 400 within the video stream that is associated with, for example, a passenger being present or absent from a seat and/or whether a seat is reclined or upright. Similarly, the video frame 420 may be cropped to communicate only the region 410 within the video stream that is associated with a seat belt buckle apparatus being fastened or unfastened.

Figure 8:
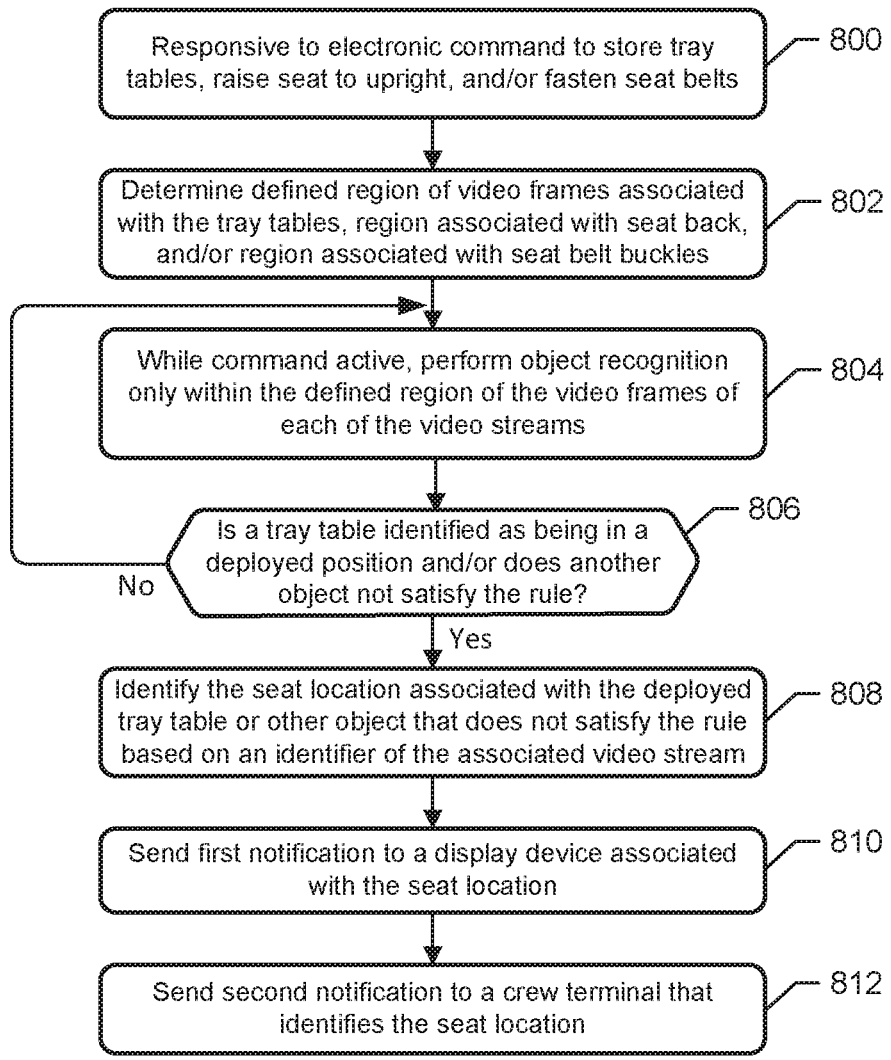
FIG. 8 is a flowchart of operations that may be performed by the object recognition computer to monitor and respond to particular types of object statuses, in accordance with some embodiments of the present disclosure.

FIG. 8 is a flowchart of operations that may be performed by the object recognition computer 500 to monitor and respond to particular types of object statuses. Referring to FIG. 8, the data structure defines one of the regions as being associated with a location of a tray table within the video frames of the video stream. The operations for object recognition can be performed responsive 800 to electronic command, which may be provided as a notification to passengers, indicating that tray tables are to be in a stored position. The object recognition computer can determine 802 from the data structure a defined region of the video frames is associated with the tray tables, and while the command remains active can perform tray table object recognition 804 only within the defined region of the video frames of each of the video streams. The object recognition can identify whether a tray table is in a stored position or a deployed position within.

The operations are further configured to respond to a determination 806 that a tray table is in the deployed position by identifying 808, based on an identity of which of the video streams from the plurality of cameras 100 the tray table is identified being in the deployed position, a seat location associated with the tray table being in the deployed position. The object recognition computer 500 can send 810 a first tray table notification to a display device 510 associated with the seat location notifying a passenger to store the tray table. Alternatively or additionally object recognition computer 500 can send 812 a second tray table notification to a crew terminal 530 that identifies the seat location where the tray table is in the deployed position.

As shown in FIG. 8, the illustrated operations can be similarly used to monitor whether seats are reclined or upright, whether seat belt buckle apparatuses are fastened or unfastened, and/or to monitor statuses of other objects such as weather carry-on bags are blocking an aisle. Responsive notifications can be sent to the identified seat location and/or to crew terminals. Various associated example operations are further described below.

In some other embodiments, the data structure defines one of the regions as being associated with a location of a portion of a seat that can be reclined within a range of reclined positions. The object recognition computer 500 can be configured to perform the object recognition operations only within the one of the regions within the video frames that is associated by the data structure with the location of the portion of the seat that can be reclined to a range of reclined positions, and identify whether the portion of the seat is reclined in the range of reclined positions or is in an upright position within the one of the regions within the video frames that is associated by the data structure with the portion of the seat.

The operations for object recognition of whether seats are reclined may be initiated responsive 800 to an electronic command for passengers to raise seats to an upright position. The operations are further configured to respond to a determination 806 that a seat is reclined by identifying 808, based on an identity of which of the video streams from the plurality of cameras 100 the portion of the seat is reclined, a seat location associated with the seat that is not in the upright position, and sending a 10 a first seat upright notification to a display device associated with the seat location notifying a passenger to raise the seat to the upright position and/or sending a 12 a second seat upright notification to a crew terminal that identifies the seat location where the seat is in a reclined position. This allows the crew to receive important information about seat statuses without disturbing all passengers.

Object Location Learning During Training Mode

Figure 9:
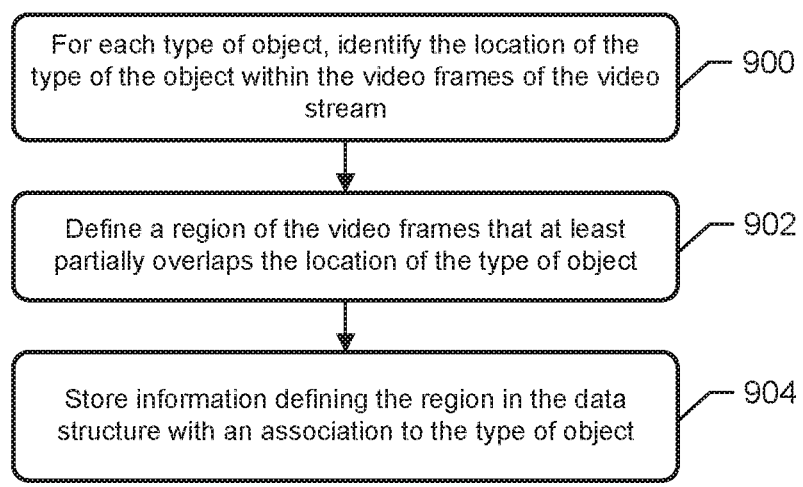
FIG. 9 is a flowchart of operations that may be performed by the object recognition computer during a training mode, in accordance with some embodiments of the present disclosure.

FIG. 9 is a flowchart of operations that can be performed by the object recognition computer to perform machine learning during a training mode that learns where particular objects are located within the video frames of each of the video streams. As noted above, because different cameras 100 can have different orientations relative to the viewed seat areas, the training mode may be repeated for each of the video streams from each of the cameras 100 to identify where different types of objects are located in video frames received in video streams from each of the different cameras 100. The object recognition computer 500 may include a neural network circuit that is trained during the training mode to identify objects within each of the video streams. In the training mode, for each of a plurality of different types of objects, the operations identify 900 a location of each type of object within the video frames of the video stream, define 902 a region of the video frames that at least partially overlaps the location of the type of object, and store 904 information defining the region in the data structure with an association to the type of object.

In some embodiments of the training mode, the operations are configured to identify the location of the type of the object within the video frames of the video stream as corresponding to a portion of a seat that is covered by a passenger when seated on the seat and is exposed when a passenger is not seated, and store the location of the portion of the seat in the data structure with an association to an identifier for the video stream.

In other embodiments of the training mode, the operations are configured to identify a shape of a seat belt apparatus when fastened. For each of the video streams, the operations repeat to identify the location of one of the types of the object within the video frames of the video stream as corresponding to a location of the shape of the seat belt apparatus within the video frames, and to store the location of the shape of the seat belt apparatus in the data structure with an association to an identifier for the video stream.

In some other embodiments of the training mode, the operations are configured to identify shape of a tray table when in the deployed position. For each of the video streams, the operations repeat to identify the location of one of the types of the object within the video frames of the video stream as corresponding to a location of the shape of a tray table within the video frames, and to store the location of the shape of a tray table in the data structure with an association to an identifier for the video stream.

Some other embodiments are directed to a neural network circuit of the object recognition computer 500. The neural network circuit includes is connected to at least one processor that operates during the training mode to identify the location of a type of object within the video frames and is further configured to repeat for each of the video streams and for each region within the video frames of the video stream that is defined by the information in the data structure, training weight values of layers of the neural network using the video data contained within the region of the video frames. The neural network circuit may have an input layer having input nodes, a sequence of hidden layers each having a plurality of combining nodes, and an output layer having an output node. The operations performed by the at least one processor during the training mode to identify the location of the type of object within the video frames provide, repeat for each of the video streams and for each region within the video frames of the video stream that is defined by the information in the data structure, to perform operations to: 1) provide to the input nodes of the neural network circuit the video data contained within the region of the video frames; and 2) adapt weights and/or firing thresholds that are used by at least the input nodes of the neural network circuit responsive to output of the output node of the neural network circuit. The output node provides the output responsive to processing the video data contained within the region of the video frames through the input nodes of the neural network circuit and through the combining nodes within the sequence of hidden layers.

In some embodiments, the input layer of the neural network includes input nodes $I_1$ to $I_N$ (where N is any plural integer). The measured performance metrics and the forecasted performance metrics are provided to different ones of the input nodes $I_1$ to $I_N$. A first one of the sequence of neural network hidden layers includes weight nodes $N_{1L1}$ (where "1L1" refers to a first weight node on layer one) to $N_{XZ1}$ (where X is any plural integer). A last one ("Z") of the sequence of neural network hidden layers includes weight nodes $N_{1LZ}$ (where Z is any plural integer) to $N_{YLZ}$ (where Y is any plural integer). The output layer includes an output node O.

Other embodiments may include any non-zero number of input layers having any non-zero number of input nodes, any non-zero number of neural network layers having a plural number of weight nodes, and any non-zero number of output layers having any non-zero number of output nodes. The number of input nodes of the neural network circuit can be selected based on the number of different objects that are to be simultaneously identifiable within frame frames during processing by the object recognition computer 500. The number of output nodes of the neural network circuit can be similarly selected based on the number of different objects that simultaneously identifiable.

Each of the input nodes multiply metric values that are input by a weight that is assigned to the input node to generate a weighted metric value. When the weighted metric value exceeds a firing threshold assigned to the input node, the input node then provides the weighted metric value to the combining nodes of the first one of the sequence of the hidden layers. The input node does not output the weighted metric value if and until the weighted metric value exceeds the assigned firing threshold.

In some of these embodiments, the neural network circuit operates different groups of the input nodes of the input layer to each receive video frames of different video streams from different cameras 100. In this manner, the neural network circuit can simultaneously process a plurality of the video streams received from a corresponding plurality of the cameras 100 to identify objects.

Streaming Camera Video Through Seat Powerlines to Object Recognition Computer

Figure 6:
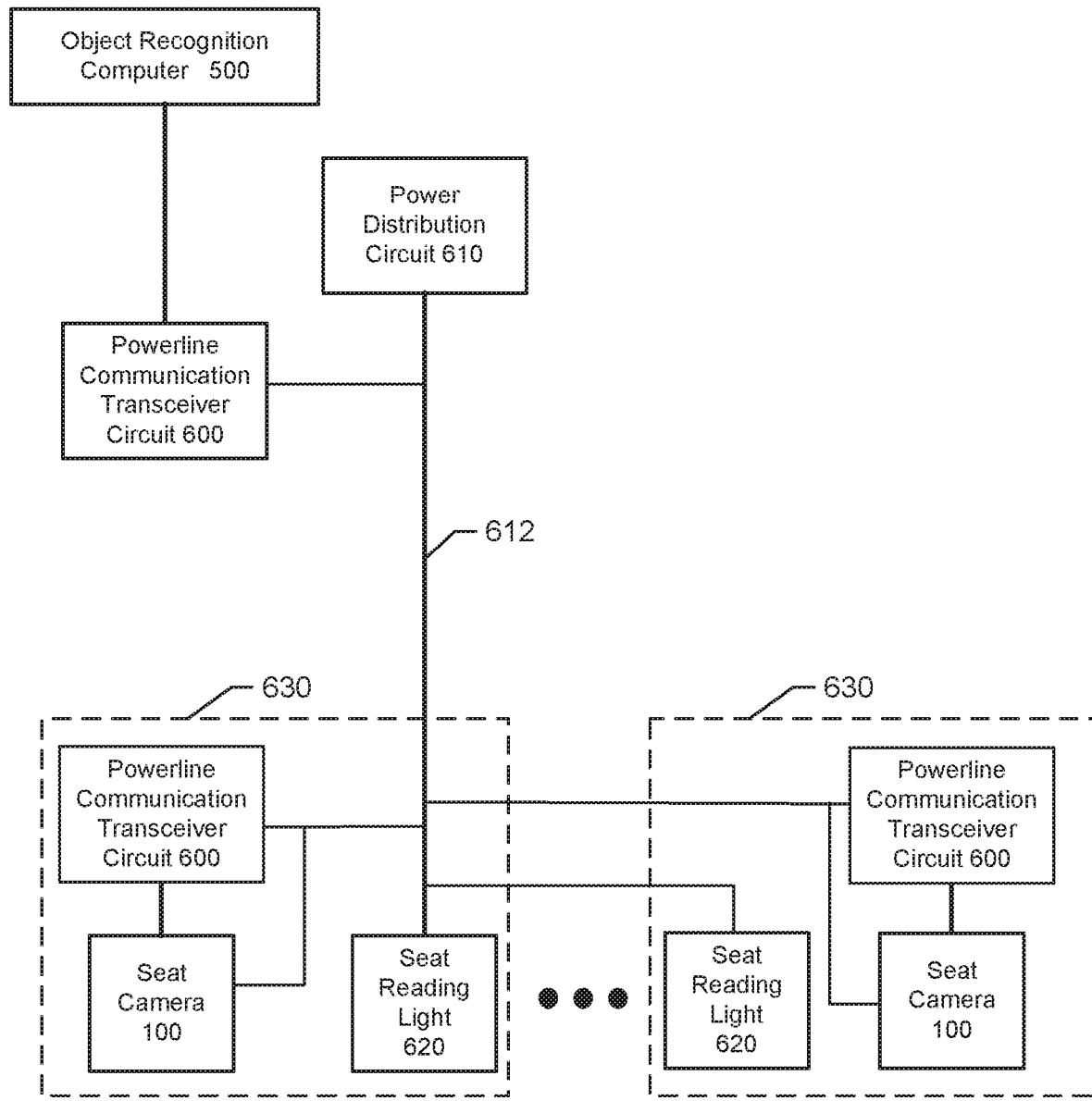
FIG. 6 is a block diagram of a portion of the system of FIG. 5 that is configured with power line transceiver circuits that communicate camera video streams through powerlines supplying power to seat reading lights 620 and/or other seat electronic devices, in accordance with some embodiments of the present disclosure.

Some other embodiments are directed to communicating the video streams from the numerous cameras 100 throughout the cabin to the object recognition computer 500 through the low voltage powerlines that are installed in the cabin to provide power to seat locations. Powerline communication are thereby used to communicate the video streams from the cameras to the object recognition computer 500. FIG. 6 is a block diagram of a portion of the system of FIG. 5 that is configured with power line transceiver circuits that communicate camera video streams through powerlines that supply power to seat reading lights 620 and/or other seat electronic devices, in accordance with some embodiments of the present disclosure.

Referring to FIG. 6, a power distribution circuit 610 supplies power through low-voltage powerlines 612 to seat reading light devices 620 that are distributed within the vehicle to provide light to passenger seat areas and/or to supply power to other seat electronic devices. The system includes powerline communication transceiver circuits 600 that are each configured to send and receive data through the powerlines 612. Each of the seat cameras 100 may be powered by power supplied by the powerline 612, and are locally connected to one of the powerline communication transceiver circuits which sends the video stream from the camera 100 through the powerlines 612. The object recognition computer 500 is connected to receive the video streams through a local one of the powerline communication transceiver circuits 600 via the powerlines 612.

In some of these embodiments, each of the powerline communication transceiver circuits 600 of the group may superimpose low-energy information signals onto power waveforms of the powerlines 612. The low-energy information signals can be modulated by video data of the data frames of the video stream generated by one of the cameras 100. As noted above, each of the cameras 100 may be connected to be operationally powered by the power supplied the powerlines 612 from the power distribution circuit 610.

This approach using powerline communications can avoid the need to install dedicated data networks to the video cameras and enables the typical low-voltage powerlines which are installed to seat areas to also transport high bandwidth video streams from the cameras 100 to object recognition computer 500. Streaming video through the powerlines avoids burdening other aircraft data networks and/or avoids generation of RF interference within the cabin if the video streams were to be transmitted through wireless communication networks.

Example Object Recognition Computer

Figure 10:
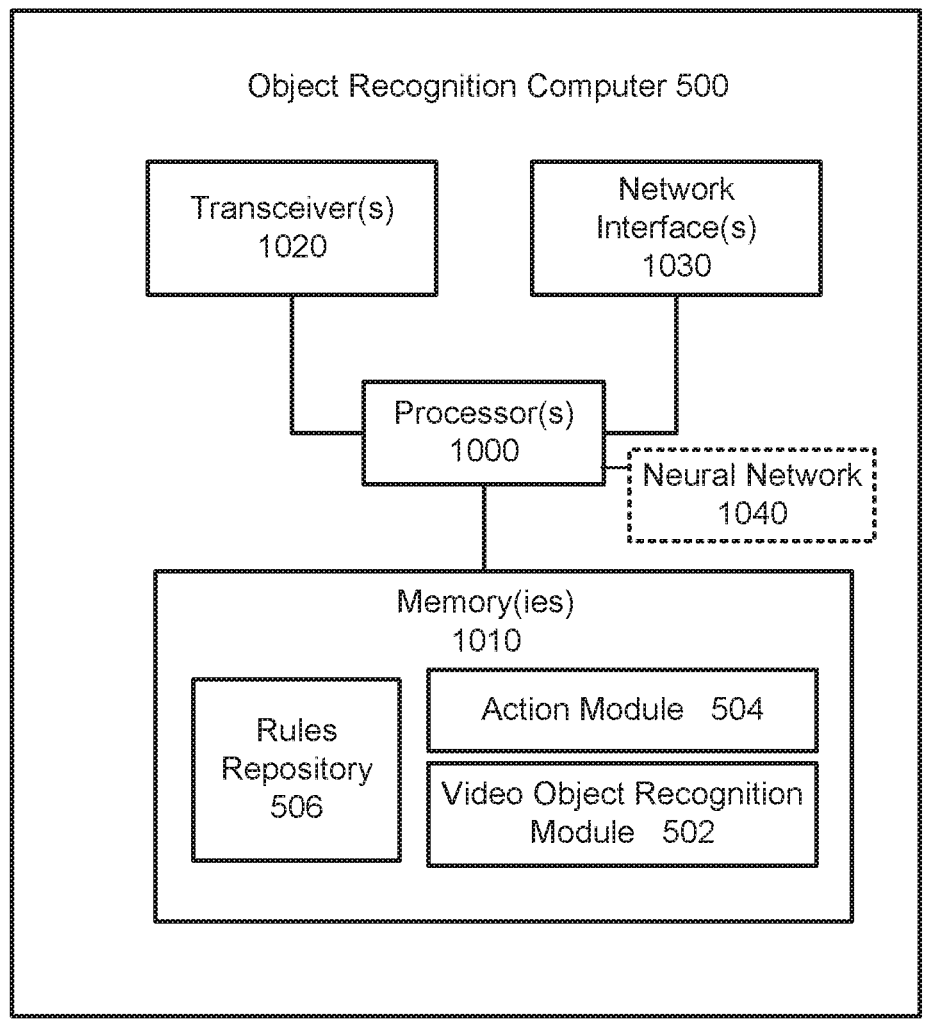
FIG. 10 is a block diagram of an object recognition computer having elements that are configured in accordance with some embodiments of the present disclosure.

FIG. 10 illustrates an object recognition computer 500 having elements that are configured to operate according to some embodiments of the present disclosure. The object recognition computer 500 includes at least one processor circuit 1000 (referred to as a processor for brevity), at least one memory circuit 1010 (referred to as a memory for brevity), at least one network interface 1030 (referred to as a network interface for brevity), and may further include at least one wireless transceiver 1020. The network interface 1030 may include the powerline communication transceiver circuit 600 of FIG. 6 and/or another wired data network interface, such as ethernet. The object recognition computer 500 may further include a neural network 1040, which may be at least partially implemented within the processor 1000 and which can perform the neural network operations explained above for performing object recognition within the video streams.

The processor 1000 may include one or more data processing circuits, such as a general purpose and/or special purpose processor (e.g., microprocessor and/or digital signal processor) that may be collocated or distributed across one or more networks. The processor 1000 is configured to execute computer program code in the memory 1010, described below as a non-transitory computer readable medium, to perform at least some of the operations described herein as being performed by an object recognition computer. The computer program code when executed by the processor 1000 causes the processor 1000 to perform operations in accordance with one or more embodiments disclosed herein for the object recognition computer. The computer program code can include program code for the action module 504 and program code for the video object recognition module 502. The memory can also store the rules repository 506, which is utilized by the action module 504 and by the video object recognition module 502 as explained above.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An object recognition computer for a vehicle, the object recognition computer comprising:
   at least one processor; and
   at least one memory storing program code executable by the at least one processor to perform operations configured to:
      receive video streams from a plurality of cameras spaced apart within the vehicle and each having a field-of-view capturing at least one passenger seat;
      for each of the video streams, performing operations to:
         retrieve from a data structure information that defines a region within video frames of the video stream where object recognition is to be performed to attempt to identify a defined object associated with the at least one passenger seat; and
         perform object recognition limited to within the defined region to identify the defined object.

2. The object recognition computer of claim 1, wherein:
   the data structure defines a plurality of different regions within the video frames of the video stream, the different regions being associated with locations of different types of objects that are to be identified; and
   when performing the object recognition for one of the types of objects, the operations for object recognition are performed only within the region that is associated with the one type of the objects.

3. The object recognition computer of claim 2, wherein:
   the data structure defines one of the regions as being associated with a location of a tray table within the video frames of the video stream; and
   the operations for object recognition are further configured to:
      perform the operations for object recognition only within the one of the regions within the video frames that is associated by the data structure with the location of the tray table; and
      identify whether a tray table is in a stored position or a deployed position within the one of the regions within the video frames that is associated by the data structure with the location of the tray table.

4. The object recognition computer of claim 3,
   wherein the operations for object recognition of tray tables are initiated responsive to occurrence of an electronic command for passengers to store tray tables; and
   wherein the operations, responsive to occurrence of the electronic command, are further configured to respond to a determination that a tray table remains in the deployed position by
      identifying, based on an identity of which of the video streams from the plurality of cameras the tray table is identified as being in the deployed position, a seat location associated with the tray table being in the deployed position, and
      sending a first tray table notification to a display device associated with the seat location notifying a passenger to store the tray table and/or sending a second tray table notification to a crew terminal that identifies the seat location where the tray table is in the deployed position.

5. The object recognition computer of claim 2, wherein:
   the data structure defines one of the regions as being associated with a location of a portion of a seat that is covered by a passenger when seated on the seat and is exposed when a passenger is not seated; and
   the operations for object recognition are further configured to:
      perform the operations for object recognition only within the one of the regions within the video frames that is associated by the data structure with the location of the portion of the seat that is covered by a passenger when seated on the seat and is exposed when a passenger is not seated; and
      identify whether the portion of the seat is occupied or is not occupied by a passenger within the one of the regions within the video frames that is associated by the data structure with the location of the portion of the seat.

6. The object recognition computer of claim 5,
   wherein the operations for object recognition of whether seats are occupied are initiated responsive to occurrence of an electronic command for passengers to be seated; and
   wherein the operations, responsive to occurrence of the electronic command, are further configured to
      determine a set of seats that is occupied before the electronic command is initiated,
      respond to a determination that a seat among the set of seats is no longer occupied by
         identifying, based on an identity of which of the video streams from the plurality of cameras the portion of the seat is not occupied, a seat location associated with the seat that is not occupied, and
         sending a seat unoccupied notification to crew terminal that identifies the seat location.

7. The object recognition computer of claim 2, wherein:
   the data structure defines one of the regions as being associated with a location of a portion of a seat that can be reclined to a range of reclined positions; and
   the operations for object recognition are further configured to:
      perform the object recognition operations only within the one of the regions within the video frames that is associated by the data structure with the location of the portion of the seat that can be reclined to a range of reclined positions; and identify whether the portion of the seat is reclined in the range of reclined positions or is in an upright position within the one of the regions within the video frames that is associated by the data structure with the portion of the seat.

8. The object recognition computer of claim 7,
wherein the operations for object recognition of whether seats are reclined are initiated responsive to an electronic command for passengers to raise seats to an upright position; and
wherein the operations, responsive to occurrence of the electronic command, are further configured to respond to a determination that a seat is reclined by
identifying, based on an identity of which of the video streams from the plurality of cameras the portion of the seat is reclined, a seat location associated with the seat that is not in the upright position, and
sending a first seat upright notification to a display device associated with the seat location notifying a passenger to raise the seat to the upright position and/or sending a second seat upright notification to a crew terminal that identifies the seat location where the seat is in a reclined position.

9. The object recognition computer of claim 2, wherein:
the data structure defines one of the regions as being associated a location of a seat belt buckle apparatus when fastened; and
the operations for object recognition are further configured to:
perform the object recognition operations only within the one of the regions within the video frames that is associated by the data structure with the location of the seat belt buckle apparatus when fastened; and
identify whether the seat belt buckle apparatus is fastened or unfastened within the one of the regions of the video frames that is associated by the data structure with the seat belt buckle apparatus when fastened.

10. The object recognition computer of claim 9,
wherein the operations for object recognition of whether seat belt buckle apparatus is fastened are initiated responsive to an electronic command for passengers to fasten seat belts; and
wherein the operations, responsive to occurrence of the electronic command, are further configured to
determine a set of seats that are occupied before the electronic command is initiated, and
respond to a determination that a seat belt buckle apparatus associated with one of the seats in the set is unfastened by
identifying, based on an identity of which of the video streams from the plurality of cameras the seat belt buckle apparatus is unfastened, a seat location associated with the seat belt buckle apparatus that is unfastened, and
sending a first seat belt notification to a display device associated with the seat location notifying a passenger to fasten the seat belt buckle apparatus and/or sending a second seat belt notification to a crew terminal that identifies the seat location where the seat belt buckle apparatus is unfastened.

11. The object recognition computer of claim 1, wherein the operations are further configured to perform during a training mode the following:
for each of a plurality of different types of objects,
identify location of the type of object within the video frames of the video stream,
define a region of the video frames that at least partially overlaps the location of the type of object, and
store information defining the region in the data structure with an association to the type of object.

12. The object recognition computer of claim 11, wherein operations during the training mode to identify the location of the type of object within the video frames are further configured to:
repeat for each of the video streams,
identify the location of the type of the object within the video frames of the video stream as corresponding to a portion of a seat that is covered by a passenger when seated on the seat and is exposed when a passenger is not seated, and
store the location of the portion of the seat in the data structure with an association to an identifier for the video stream.

13. The object recognition computer of claim 11, wherein operations by the at least one processor during the training mode to identify the location of the type of object within the video frames are further configured to:
identify shape of a seat belt apparatus when fastened; and
repeat for each of the video streams,
identify the location of one of the types of the object within the video frames of the video stream as corresponding to a location of the shape of the seat belt apparatus within the video frames, and
store the location of the shape of the seat belt apparatus in the data structure with an association to an identifier for the video stream.

14. The object recognition computer of claim 11, wherein operations by the at least one processor during the training mode to identify the location of the type of object within the video frame are further configured to:
identify shape of a tray table when in the deployed position; and
repeat for each of the video streams,
identify the location of one of the types of the object within the video frames as corresponding to a location of the shape of a tray table within the video frames, and
store the location of the shape of a tray table in the data structure with an association to an identifier for the video stream.

15. The object recognition computer of claim 11, further comprising a neural network circuit,
wherein operations by the at least one processor during the training mode to identify the location of the type of object within the video frames are further configured to repeat for each of the video streams and for each region within the video frames of the video stream that is defined by the information in the data structure, training weight values of layers of the neural network using the video data contained within the region of the video frames.

16. The object recognition computer of claim 15, wherein the neural network circuit has an input layer having input nodes, a sequence of hidden layers each having a plurality of combining nodes, and an output layer having an output node; and
the operations performed by the at least one processor during the training mode to identify the location of the type of object within the video frames provide, repeat for each of the video streams and for each region within the video frames of the video stream that is defined by the information in the data structure, operations to:

provide to the input nodes of the neural network circuit the video data contained within the region of the video frames; and adapt weights and/or firing thresholds that are used by at least the input nodes of the neural network circuit responsive to output of the output node of the neural network circuit, wherein the output node provides the output responsive to processing the video data contained within the region of the video frames through the input nodes of the neural network circuit and through the combining nodes within the sequence of hidden layers.

17. The object recognition computer of claim 1, further comprising:

powerline communication transceiver circuits connected to powerlines connected to feed power from at least one power distribution circuit to seat reading light devices that are distributed within the vehicle to provide light to passenger seat areas, wherein the cameras are connected to communicate the video streams through a group of the powerline communication transceiver circuits and the powerlines toward the object recognition computer, and wherein the object recognition computer is connected to receive the video streams through one of the powerline communication transceiver circuits and the powerlines.

18. The object recognition computer of claim 17, wherein each of the powerline communication transceiver circuits of the group is configured to superimpose low-energy information signals onto power waveforms of the powerlines, the low-energy information signals being modulated by video data of the data frames of the video stream generated by one of the cameras.

19. The object recognition computer of claim 18, wherein the cameras are further connected to the powerlines to be operationally powered by the power supplied through the powerlines by the at least one power distribution circuit.

20. An inflight entertainment system comprising:

a plurality of video display units connected to passenger seats;

a content server storing content for display through the video display units;

a plurality of cameras spaced apart within the vehicle and each having a field-of-view capturing at least one of the passenger seats;

an object recognition computer; and a network that communicatively connects the video display units, the cameras, the content server, and the object recognition computer, wherein the content server provides content to the video display units for display, wherein the cameras are connected to communicate video streams through the network toward the object recognition computer, and wherein the object recognition computer is connected to receive the video streams through the network, wherein the object recognition computer is configured to, for each of the video streams, performing operations to retrieve from a data structure information that defines a region within video frames of the video stream where object recognition is to be performed to attempt to identify a defined object associated with the at least one passenger seat, and perform object recognition limited to within the defined region to identify the defined object.

\* \* \* \* \*